United States Patent [15] 3,676,312
Sekmakas [45] July 11, 1972

[54] AMINOPLAST RESINS PARTICULARLY ADAPTED FOR ELECTROCOATING AND PROCESS FOR PRODUCING THE SAME

[72] Inventor: Kazys Sekmakas, Chicago, Ill.
[73] Assignee: DeSoto, Inc., Des Plaines, Ill.
[22] Filed: March 13, 1970
[21] Appl. No.: 19,457

[52] U.S. Cl............................................................204/181
[51] Int. Cl.......................................B01k 5/02, C23b 13/00
[58] Field of Search.....................................................204/181

[56] References Cited
UNITED STATES PATENTS
3,502,557  3/1970  Yurchesen et al.......................204/181

*Primary Examiner*—Howard S. Williams
*Attorney*—Dressler, Goldsmith, Clement & Gordon

[57] ABSTRACT

Aminoplast resins particularly adapted for use in electrocoating are provided by heat reacting a polyamine, such as benzoguanamine, with formaldehyde in the presence of a mixture of etherifying alcohol and a small proportion of an hydroxy carboxylic acid such as dimethylol propionic acid. The reaction is conducted in a single stage in the absence of extraneous acidic or basic catalysts.

15 Claims, No Drawings

AMINOPLAST RESINS PARTICULARLY ADAPTED FOR ELECTROCOATING AND PROCESS FOR PRODUCING THE SAME

The present invention relates to the production of organic solvent-soluble heat hardening aminoplast resins of low molecular weight possessing improved stability and compatibility. The invention contemplates numerous features including simplified production procedure, freedom from contaminating salts and water insoluble products which are water dispersible and which, unlike conventional aminoplasts, will respond electrophoretically to a unidirectional electrical current. The invention especially contemplates aminoplast resins based on triazines containing a pair of primary amine groups, particularly benzoguanamine.

The usual procedure for preparing organic solvent-soluble heat hardening aminoplast resins, especially those based on aminotriazines such as melamine and polyamine derivatives thereof, is to first react the polyamine with the aldehyde, normally formaldehyde, in the presence of an alkaline catalyst which promotes methylol formation. In the absence of an alkaline catalyst, the reaction does not proceed well, and if an acid catalyst is present, polymerization takes place. After the first stage reaction has been completed, alcohol is added together with sufficient acid catalyst to neutralize the alkaline catalyst left over from the methylolation stage and to produce an acid pH enabling the alcohol to etherify the previously generated methylol functionality.

If it were desired to change the alcohol ether group, this could now be done by cooking the previously formed etherified resin with the new alcohol to cause an ether interchange to take place.

However, the resins of the prior art, as will be evident from the foregoing, require a complex procedure for their production and salts formed by the needed catalysts remain in the product. Moreover, the acid catalysis needed for etherification causes more polymerization than is desired for certain utilities, particularly where it is desired to formulate stable aqueous dispersions. Still further, and when superior film properties such as outstanding salt spray resistance and detergent resistance are desired, it has been found that the conventionally produced water dispersible aminoplast resins are deficient.

In accordance with the present invention, the two stage reaction of the prior art is conducted in a single stage in the presence of a mixture of alcohol and hydroxy carboxylic acid and in the absence of any acidic or basic catalyst. Surprisingly, it has been found that methylolation proceeds satisfactorily, polymerization is minimized, salts are not generated, and the product includes carboxylic acid groups which improve compatibility with other resins and facilitates electrophoretic transport in aqueous alkaline medium. Moreover, the products are stable in aqueous alkaline dispersion and electrocoated film deposits exhibiting improved salt spray and detergent resistance have been obtained.

Interestingly, and if the same materials and proportions as are used in the present invention are utilized in a two-stage reaction, with the first stage catalyzed with a base such as sodium carbonate and the second phase catalyzed with an acid, such as paratoluene sulfonic acid, then the resin so-produced is not comparable to the resins of the invention since electrocoated films comprising the same in admixture with hydroxy-functional acidic resins tend to blister and to lose adhesion in the blistered areas when immersed in detergent solutions. No such blistering or loss of adhesion occurs in the invention.

The polyamines which are used in this invention should include a plurality of primary amino hydrogen atoms, preferably at least four. Thus, urea, melamine and substituted melamines may be used, particularly mono-substituted melamine such as butyl or benzyl-substituted melamine which are guanamines. Benzoguanamine is particularly contemplated.

The polyamine is reacted with aldehyde, normally formaldehyde, which is desirably used in the form of paraformaldehyde, but the specific source of formaldehyde is of secondary significance. This invention is directed to thermosetting resins and this requires at least about 0.8 moles of formaldehyde per equivalent of amino hydrogen in the polyamine available for reaction therewith. Normally, approximately a stoichiometric proportion of aldehyde based on amino hydrogen is used, the presence of excess aldehyde, while permissible, being wasteful. The reaction is carried out by a simple cook in which the formaldehyde adducts with the polyamine to substantially completely methylolate the amino hydrogen with minimal polymerization through condensation and the methylol groups are etherified by the alcohol and hydroxy carboxylic acids used. The temperature of reaction is of secondary significance, temperatures of about 50°–200° C. being broadly appropriate, but it is preferred to use a temperature of 80°–150° C. for the simple heat reaction contemplated.

This invention requires that alcohol be present during the reaction. Broadly, any alcohol, even methanol, may be used, but the invention stresses solvent soluble products which will not dissolve in water, so longer chain alcohols are desired to minimize water solubility. Thus, at least some alcohol having two or more carbon atoms and free of ether oxygen should be present such as ethanol or more preferably butanol or longer chain alcohol such as 2-ethyl hexanol. Since water insoluble products which may be dispersed in water with the aid of a base are particularly desired, it is preferred that a major weight proportion of the alcohol be a propanol or a butanol or a mixture thereof. Butanols are especially preferred since shorter chain alcohols produce less water insolubility and longer chain alcohols reduce water dispersibility. However, mixtures of alcohols can be used, such as a mixture of ethanol, butanol or isobutanol, and iso-octyl alcohol, to provide balanced properties. Ether alcohols such as 2-ethoxy ethanol may also be used and these improve water dispersibility of the water insoluble product though chemical resistance decreases somewhat.

It should be observed that this invention is particularly concerned with resins which do not dissolve in aqueous alkaline medium despite low molecular weight and the presence of carboxylic acid groups which can form salts with the base used to render the water alkaline. This generally requires that at least 25 percent of the alcohol used be an alkanol containing at least four carbon atoms.

The proportion of alcohol is subject to wide variation, it being recognized that the more alcohol present, the more the methylol groups are blocked by etherification to minimize molecular weight. Relating proportions to amino hydrogen atoms in the starting polyamine, there should be at least 0.1 mol of alcohol per equivalent of amino hydrogen. Preferably, the ratio of mols of alcohol per equivalent of amino hydrogen should be between 0.2 and 1.5, most preferably between 0.3 and 0.7.

The proportions which are appropriate are conveniently considered by relating the total hydroxy functionality supplied by the alcohol and the hydroxy acid assuming complete reaction of all the hydroxy groups with the methylol groups on the theoretical basis of one methylol group from every amino hydrogen atom. In this regard, the alcohol is frequently more volatile than the hydroxy acid and a considerable portion of the alcohol initially charged is removed during the reaction. On the basis of materials left in the reaction product, it is desired to have at least 0.30 hydroxy equivalents per equivalent of amino hydrogen in the polyamine, preferably from 0.4–0.75 hydroxy equivalents. In combinations with these proportions, the invention desired water insolubility in combination with water dispersibility. This is best achieved using alcohols containing at least three carbon atoms and the limited etherification implicit in the proportions noted. This combination of long chain alcohol and stoichiometric deficiency of total hydroxy leads to water insolubility combined with maximum water dispersibility.

Hydroxy carboxylic acids as a class are useful in the invention. The preferred compounds are aliphatic or cycloaliphatic hydroxy acids containing a single carboxylic acid groups and one or more hydroxy groups which may be primary, secondary or tertiary. However, a plurality of carboxylic acid groups may be present. Less desirably, hydroxy acids known as phenolic acids may be used and aromatic substituents on the aliphatic compound may be tolerated. Since this invention primarily relies on direct etherification, the hydroxy acid may include ether groups if desired.

Preferred hydroxy carboxylic acids are illustrated by dimethylol propionic acid, but other appropriate compounds are glycolic acid, the hydroxy propionic acids, the hydroxy butyric acids, and the hydroxy stearic acids. The useful phenolic acids are illustrated by salicylic acid and diphenolic acid.

Dimethylol propionic acid used to illustrate the invention has the formula:

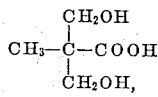

Diphenolic acid has the formula:

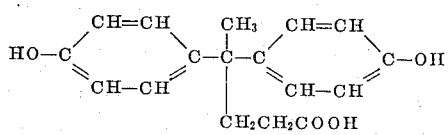

The proportion of hydroxy carboxylic acid is also subject to wide variation, but at least about 0.02 mol thereof should be used per mol of polyamine, preferably at least about 0.1 mol up to about 0.4 mol on the same basis. More hydroxy carboxylic acid can be used up to about 1.0 mol per mol of polyamine, but larger amounts add excessive acidity to the product. More hydroxy acid can be used when the acid selected is a monohydroxy compound since this eliminates chain growth through esterification.

A product having an acid value of at least about 4, preferably at least 8 is desired. The acid value is preferably kept below 50. Thus, where water insoluble products dispersible in aqueous alkaline medium are desired, the alcohol used should contain at least 3 carbon atoms and be used in small amounts as explained, and the hydroxy acid should be used in an amount to provide an acid value of from 8–50.

While considerable advantage accrues from the single stage procedure described, the etherified aminoplast resin can be produced in other ways. Thus, one can go forward with the bulk of the reaction and then add a trace of acid such as paratoluene sulfonic acid or phosphoric acid in order to encourage etherification and minimize molecular weight. Thereafter, this acid can be removed by precipitation with a base such as calcium hydroxide as opposed to neutralization to form soluble salts. The precipitated salt can be removed by filtration. Products far more useful than salt containing products can be provided in this way. Also, the resin can be produced as described in the prior art and the hydroxy acid incorporated by transetherification. In either instance, the invention using longer chain alcohols, especially in smaller amount as noted, and particularly employing guanamine compounds such as benzoguanamine, produces water insoluble alkaline water dispersible products which are better adapted for use in electrophoretic coating systems. If desired, these products can be treated to minimize the salt content thereof, e.g., by water extraction or by ion exchange.

The electrophoretic coating systems are themselves well known, employing an acidic resin which is associated with water using a base, frequently a volatile nitrogenous base such as triethyl amine. It is convenient to mix the aminoplast resin with the acidic resin in solution in a water miscible organic solvent, such as methyl ethyl ketone or 2-ethoxy ethanol, and then disperse the solution in an aqueous alkaline medium. Some or all of the based used for neutralization may be added to the resin solution before admixture with water. The total amount of base can vary as desired, final pH being broadly within the range of pH 6–11.

While, broadly, carboxyl-functional resins having an acid value of at least about 8 up to about 300, most preferably from 12–100, are useful, it is preferred to employ an hydroxy-functional product produced by reaction with monoepoxide as described in the copending application of Sekmakas, Gauger, and Henning, Ser. No. 634,480, filed Apr. 28, 1967.

The aminoplast resins of this invention are particularly desirable because they exhibit excellent compatibility with the carboxyl-functional resins and provide a thermosetting cure therewith. The cure is especially desirable when hydroxy functionality is included in the carboxyl functional resin but an excellent cure is obtained when the hydroxy functionality is not present. Appropriate baking temperatures for the cure range from about 300° F. to about 600° F. for periods of from about 1 hour down to a few seconds at the highest temperature. Preferred baking schedules involve the application of a temperature of from 350°–500° F. for a period of from 30 minutes to about 20 seconds.

The invention is illustrated in the examples which follow.

EXAMPLE 1

Charge Composition (Grams)

1,010 Benzoguanamine (5.4 moles)
625 Paraformaldehyde (18.7 moles)
820 Butanol (11.08 moles)

Charge the above into reactor, set reflux condenser, and heat until all are dissolved, and then add:

150 Dimethylol Propionic Acid (1.12 moles)
90 Benzene (reflux solvent).

Set trap with benzene and heat to 110°–115° C. Distill off 255 cc. water. Replace trap and distill off 224 grams butanol at 120° C. Add 2-ethoxy ethanol to thin to 66.8 percent solids. The product so-obtained has a viscosity (Gardner) of $Z_6$–$Z_7$ (200 poises), and an acid value (non-volatile solids) of 29.2.

EXAMPLE 2

Charge Composition (Grams)

910 Benzoguanamine(4.87 moles)
620 Paraformaldehyde (18.6 moles)
1,430 Butanol (19.3 moles)
120 Dimethylol propionic Acid (0.9 mole)
90 Benzene The above charge is processed in the same manner as in Example 1, with 263 cc. of water being collected and 560 grams of butanol being distilled off. Again, the product so-obtained is thinned with 2-ethoxy ethanol to provide a solids content of 66.6 percent. In this instance, it has a viscosity (Gardner) of U–V (10 poises) and an acid value (non-volatile solids) of 23.6.

EXAMPLE 3

Example 1 was repeated, only dimethylol propionic acid was eliminated from the reaction. The resulting product was completely water insoluble, very difficult to disperse in water, and heavy settling occurred upon standing at room temperature.

EXAMPLE 4

Preparation of Benzoguanamine Resin Utilizing

2-Ethoxy Ethanol as Etherification Solvent

Charge Composition (Parts by Weight)
740 Benzoguanamine
510 Paraformaldehyde
1,430 2-Ethoxy Ethanol
120 Benzene (reflux solvent)

Charge the above into reactor, set reflux condenser, and heat to 105° C. Hold until solution clears (until benzoguaname dissolves). Hold 30 minutes, and then add 120 parts dimethylol propionic acid. Set Dean-Stark trap with benzene and heat to 115°–120° C. Distill off water and collect in trap (290 cc.). Replace trap and distill of 605 grams solvent. Cool to 90° C. and add 450 parts isopropanol to reduce viscosity.

The final characteristics of the resin are:

| | |
|---|---|
| Solids | 66.5% |
| Viscosity (Gardner) | $Z_2 - Z_3$ |
| Color (Gardner) | 1 |
| Acid Value (non-volatile) | 26.8 |

EXAMPLE 5

Preparation of Benzoguanamine Resin

Utilizing Gluconic Acid

Charge Composition (Parts by Weight)

1,010 Benzoguanamine
625 Paraformaldehyde
820 Butanol

Charge the above into reactor, set reflux condenser, and heat to 105° C. Hold until solution clears (until all benzoguanamine is dissolved). Hold for 30 minutes and then add:

200 Gluconic Acid (50 percent solution in water)
90 Benzene

Set Dean-Stark trap with benzene and distill off 360 ml. of water. Remove trap. Increase temperature to 115°–120° C. and distill of 110 grams solvent. Then add:

400 2-Ethoxy Ethanol
300 4-Methoxy-4-Methyl-Pentanone-2

The final characteristics of the resin are:

| | |
|---|---|
| Solids | 62.5% |
| Viscosity (Gardner) | $Z_5$ |
| Color (Gardner-Holdt) | 1 |
| Acid Value (non-volatile) | 9.2 |

EXAMPLE 6

Charge Composition (Parts by Weight)

1,946 Polyhydric Polyether
(See Note 1)
1,834 Soya fatty acids
60 Xylol (reflux)

Charge the above into reactor. Heat to 215° C. Set Dean-Stark trap and distill off water of esterification. Hold for acid value of 4 to 6. Distill off xylol, cool to 90° C. and add:

220 Trimellitic Anhydride
400 Methyl Ethyl Ketone

Reheat to 100°–110° C. and hold for acid value of 35–38.

800 Methyl Ethyl Ketone
53 Triethyl Amine

Add the above and reheat to 90° C.

115 Butylene Oxide

Add butylene oxide from addition funnel over 30 minutes.

Hold for acid value of 24-26, then cool to room temperature.

The final characteristics of the hydroxy ester are:

| | |
|---|---|
| Solids | 78.2% |
| Viscosity (Gardner) | X–Y |
| Acid Value (non-volatiles) | 25.1 |

Note 1 - The polyhydric polyether utilized is a commercial material available from Union Carbide and identified by the trade designation UCAR POLYOL DCP–200. The formula and physical properties of this material are listed below:

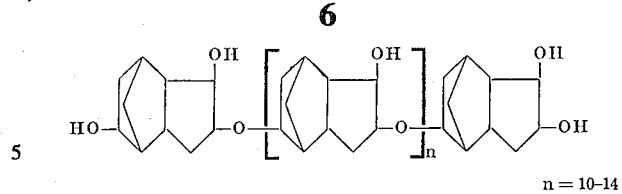

$n = 10-14$

Physical Properties of "UCAR" POLYOL DCP-200

| | |
|---|---|
| Physical appearance | Light straw-colored solid |
| Softening point | 170–200° C. |
| Hydroxyl, percent | 11.4–12.2 |
| Ester equivalent (Grams required to esterify 1 gram mol weight of fatty acid | 145 |
| Solution viscosity in dimethyl formamide, 50 percent | 150–225 cps. |
| Gardner color of a 50 percent solution in dimethyl formamide | 7 max. |
| Specific gravity | 1.22 |
| Bulk density | 42–43 lbs./cu.ft. |
| Non-volatiles, percent | 98 |

COATING PROCEDURE

The coating operation is performed in a metal tank, which is equipped with a recirculating pump and a thermometer. The tank serves as a cathode and zinc phosphate treated steel panels or aluminum panels are utilized as the anodes. The volume of the tank is two liters. Direct current is imposed on the metal container (cathode) and on the panels (anode) from an external circuit. Panels 4 inches wide and 8 inches dipped length are used as the anodes for coating. The voltage across the bath is run up from zero to the voltage desired (maximum 350 volts) during panel coating to deposit a film before electrical resistance of the film virtually stops deposition at the maximum voltage used. The deposited film, even before baking, is water resistant, slightly tacky and has very good adhesion to metal.

A clear formulation using the resin of Example 6 is formulated to provide aqueous electrodeposition baths containing 10 percent solids and neutralized with a stoichiometric proportion of triethyl amine (based on the acidity of the resin of Example 6).

When the resinous product of Example 6 is utilized with the benzoguanamine resin of Example 1, the aminoplast resin is first blended with the resin of Example 6, then neutralized with triethyl amine and then dispersed in water at 10 percent solids. The pH of the electrocoat bath is 9.1.

The coatings are cured at 400° F. for 20 minutes.

Evaluation of Water Dispersible Benzoguanamine Resin of Example 1

| | | Ratio of Resin Solids |
|---|---|---|
| Benzoguanamine Resin of Example 1 | | 30% |
| Resin of Example 6 | | 70% |
| Voltage | Film Thickness (mils) | 60° Gloss |
| 150 volts | 0.25 | 49 |
| 175 volts | 0.31 | 61 |
| 200 volts | 0.39 | 64 |
| 225 volts | 0.47 | 68 |
| 250 volts | 0.65 | 72 |
| 275 volts | 0.81 | 80 |

Film appearance: Continuous, glossy
Film hardness: 2H–3H
Solvent Resistance (methyl ethyl ketone)—Very Good—no effect after 50 rubs
1% aqueous Tide solution (48 hours immersion)—A few blisters, small to very small in size.

Comparison with Melamine Resin

The water dispersible benzoguanamine resin of Example 1 was replaced with a corresponding proportion of a water dispersible methylated-ethylated melamine resin (XM-1116

— American Cyanamid). After immersion in 1 percent aqueous Tide solution, the film was completely blistered and lost adhesion from the substrate.

The water dispersible benzoguanamine resin of Example 1 was again replaced, this time with hexamethoxy-methyl melamine (a water soluble melamine resin). After immersion in 1 percent aqueous Tide solution, the film was again completely blistered and lost adhesion from the substrate.

EXAMPLE 7

The polyhydric polyether of Example 6 was replaced with an addition polymer of styrene with allyl alcohol and esterified with dehydrated castor fatty acids and trimellitic anhydride.

Charge Composition (Parts by Weight)

1,800 Styrene Allyl Alcohol Copolymer (Equivalent Weight 300)
900 Dehydrated Castor Fatty Acids (Equivalent Weight 280)
60 Xylol (reflux solvent)
  Charge the above into reactor. Set trap with xylol and heat to 220°–225° C. Hold for an acid value of 4 to 6 and distill off xylol.
350 Methyl Ethyl Ketone
  Add solvent and cool to 105° C.
105 Trimellitic Anhydride
  Add trimellitic anhydride and hold for 2 hours.
300 2-Ethoxy Ethanol — Add solvent to provide a resin having the following final characteristics:

| Solids | 72% |
|---|---|
| Viscosity (Gardner) | $Z - Z_1$ |
| Color (Gardner) | 2 – 3 |
| Acid Value (non-volatile) | 34.5 |

The resin of the foregoing Example 7 was evaluated in electrocoating formulations, by using the same in place of the resin of Example 6 evaluated heretofore. Using the same proportions, coating procedure and conditions used for evaluating the resin of Example 6, excellent coating properties and detergent resistance were obtained when the resin of the present Example 7 was used in combination with the benzoguanamine resin of Example 1.

It is desired to point out that the use of the benzoguanamine resins of the present invention provide numerous important benefits in addition to the improved stability and compatibility noted hereinbefore. Thus, the curing properties are better since the acidity of the benzoguanamine resin enhances the cure. Additionally, the benzoguanamine-based materials utilized in electrocoating deposit films which are more highly resistive so that thinner films are deposited at higher voltages. This is especially advantageous when it is desired to minimize the thickness of the film which is formed. Still further, the increase in compatibility which is achieved through the use of an acid aminoplast resin leads to the production of increased gloss in the films which result.

The invention is defined in the claims which follow.

I claim:

1. A method of electrophoretically depositing a thermosetting coating on an electrically conductive base comprising passing a unidirectional electrical current through an aqueous electrocoating bath containing carboxyl functional resin and aminoplast resin to cause said resins to codeposit on said base and form a continuous coating thereon, said bath comprising water having said resins dispersed therein, said carboxyl-functional resin having an acid value of at least about 8 up to about 300 and being dispersed in said bath by having at least a portion of its carboxyl functionality neutralized with a base, and said aminoplast resin being an organic solvent-soluble, water-insoluble, heat-hardening aminoplast resin produced by heat reacting a triazine containing a plurality of primary amino hydrogen atoms with at least about 0.8 mol of formaldehyde per equivalent of amino hydrogen in said triazine in the presence of a mixture of at least 0.1 mol of alcohol containing at least three carbon atoms per equivalent of amino hydrogen in said triazine and at least 0.02 up to about 1.0 mol of hydroxy carboxylic acid per mol of triazine, said reaction being conducted in a single stage in the absence of extraneous acidic or basic catalyst, said aminoplast resin having an acid number of at least about 4 and being dispersed in said bath with the aid of a base, removing the coated base from said bath and baking the same to cure the coating.

2. A method as recited in claim 1 in which at least approximately a stoichiometric proportion of formaldehyde is used based on the amino hydrogen in said triazine.

3. A method as recited in claim 1 in which said alcohol is used in an amount providing between 0.2 and 1.5 mols of alcohol per equivalent of amino hydrogen.

4. A method as recited in claim 1 in which said alcohol contains at least three carbon atoms, is free of ether oxygen, and is used in an amount providing between 0.3 and 0.7 mol of alcohol per equivalent of amino hydrogen.

5. A method as recited in claim 4 in which said triazine is benzoguanamine.

6. A method as recited in claim 1 in which said heat reaction is carried out at a temperature of 80°–150° C. and a portion of said alcohol is removed during the reaction leaving behind from 0.4–0.75 equivalents of total hydroxy functionality.

7. A method as recited in claim 1 in which said hydroxy carboxylic acid is dimethylol propionic acid.

8. A method as recited in claim 1 in which said aminoplast resin has an acid number of from 8–50.

9. A method as recited in claim 1 in which at least 25 percent of the alcohol used is an alkanol containing at least four carbon atoms.

10. A method as recited in claim 1 in which said alcohol contains a major weight proportion of a propanol, a butanol, or a mixture thereof, and said hydroxy carboxylic acid is an aliphatic or cycloaliphatic hydroxy acid containing a single carboxylic acid group.

11. A method as recited in claim 1 in which said carboxyl-functional resin also includes hydroxy functionality and has an acid number of from 12–100.

12. A method as recited in claim 1 in which said bath has a pH of from 6–11, and includes water miscible organic solvent.

13. A method as recited in claim 1 in which said triazine contains at least four primary amino hydrogen atoms.

14. A method of electrophoretically depositing a thermosetting coating on an electrically conductive base comprising passing a unidirectional electrical current through an aqueous electrocoating bath containing carboxyl functional resin and aminoplast resin to cause said resins to codeposit on said base and form a continuous coating thereon, said bath comprising water having said resins dispersed therein, said carboxyl-functional resin having an acid value of at least about 12 up to about 100 and being dispersed in said bath by having at least a portion of its carboxyl functionality neutralized with a base, and said aminoplast resin being an organic solvent-soluble, water-insoluble, heat-hardening aminoplast resin produced by heat reacting benzoguanamine with at least about 0.8 mol of formaldehyde per equivalent of amino hydrogen in said benzoguanamine in the presence of a mixture of between 0.2 and 1.5 mols of alcohol containing at least three carbon atoms and free of ether oxygen per equivalent of amino hydrogen in said benzoguanamine and at least 0.1 mol up to about 1.0 mol of hydroxy carboxylic acid per mol of benzoguanamine, said reaction being conducted in a single stage in the absence of extraneous acidic or basic catalyst, said aminoplast resin having an acid number of at least about 8 and being dispersed in said bath with the aid of a base, removing the coated base from said bath and baking the same to cure the coating.

15. A method as recited in claim 14 in which said hydroxy carboxylic acid is dimethylol propionic acid used in an amount of up to about 0.4 mol per mol of benzoguanamine.

* * * * *